(12) United States Patent
Leroy et al.

(10) Patent No.: US 7,695,042 B2
(45) Date of Patent: Apr. 13, 2010

(54) RECEPTACLE DEVICE AND MOTOR VEHICLE PROVIDED THEREWITH

(76) Inventors: Alain Leroy, Dieschlstrasse 1, Diessen-Dettenschwang (DE) D-86911; Heinz Pschorn, Rumburger Ringer 26, Dachau (DE) D-85221; Robert Braun, Mahntalstrasse 18, Berg (DE) D-82335; Dirk Legler, Kreuzweg 5, Weil (DE) D-86947; Michael Koelbl, Jägerbauerstrasse 9, Neuried (DE) D-82061; Oliver Vogt, Herzogstrasse 81, München (DE) D-80796; Thomas Rudolph, Inninger Strasse 13, Hechendorf (DE) D-82229; Thomas Jakimenczuk, Am Grenzweg 5, Höhenkirchen (DE) D-85635

( * ) Notice: Subject to any disclaimer, the term of this patent is extended or adjusted under 35 U.S.C. 154(b) by 0 days.

(21) Appl. No.: 11/908,372

(22) PCT Filed: Mar. 10, 2006

(86) PCT No.: PCT/DE2006/000440
§ 371 (c)(1),
(2), (4) Date: Oct. 23, 2007

(87) PCT Pub. No.: WO2006/094499
PCT Pub. Date: Sep. 14, 2006

(65) Prior Publication Data
US 2008/0150310 A1    Jun. 26, 2008

(30) Foreign Application Priority Data
Mar. 11, 2005  (DE) ................. 10 2005 011 678

(51) Int. Cl.
*B60R 7/04*    (2006.01)
(52) U.S. Cl. .................................... 296/37.16

(58) Field of Classification Search ............. 296/65.13, 296/37.16, 37.1
See application file for complete search history.

(56) References Cited

U.S. PATENT DOCUMENTS

| 4,148,516 | A | * | 4/1979 | Gotomyo ............. 296/37.1 |
| 4,202,577 | A | * | 5/1980 | Breitschwerdt et al. .. 296/24.43 |
| 4,668,001 | A | * | 5/1987 | Okumura et al. ....... 296/37.16 |
| 4,781,234 | A | * | 11/1988 | Okumura et al. ....... 160/23.1 |
| 5,011,208 | A | * | 4/1991 | Lewallen ............. 296/37.16 |
| D358,125 | S | * | 5/1995 | Jackson ............... D12/425 |
| 5,632,520 | A | * | 5/1997 | Butz ................. 296/24.43 |
| 6,276,735 | B1 | * | 8/2001 | Champion ............ 296/37.6 |

(Continued)

FOREIGN PATENT DOCUMENTS
EP    0713805    5/1996

(Continued)

*Primary Examiner*—Kiran B. Patel
(74) *Attorney, Agent, or Firm*—Fitch, Even, Tabin & Flannery; John M. Naber

(57) ABSTRACT

The invention relates to a receiving device (1) for a motor vehicle comprising at least one a tray-shaped container (2) and a hat rack (3), wherein said hat rack (3) is shaped in such a way that it covers the tray-shaped container (2), the inventive receiving device (1) can be placed between the loading space (4) and the passenger compartment (5) of the motor vehicle and the hat rack (3) is at least partly made of a flexible material.

6 Claims, 1 Drawing Sheet

U.S. PATENT DOCUMENTS

| | | | |
|---|---|---|---|
| 6,290,277 B1 * | 9/2001 | Spykerman et al. | 296/24.43 |
| 6,439,633 B2 * | 8/2002 | Nemoto | 296/37.14 |
| 6,592,165 B2 * | 7/2003 | Ament et al. | 296/37.16 |
| 6,733,060 B1 * | 5/2004 | Pavkov et al. | 296/37.16 |
| 6,742,823 B2 * | 6/2004 | Guanzon et al. | 296/37.16 |
| 6,752,304 B1 * | 6/2004 | Hotary et al. | 224/544 |
| 6,966,591 B2 * | 11/2005 | Schlecht | 296/37.16 |
| 7,240,944 B2 * | 7/2007 | Plettrichs et al. | 296/37.16 |
| 2002/0163220 A1 * | 11/2002 | Ament et al. | 296/37.16 |

FOREIGN PATENT DOCUMENTS

| | | |
|---|---|---|
| EP | 0761503 | 3/1997 |
| EP | 1350673 | 10/2003 |
| WO | WO 9741755 | 11/1997 |

\* cited by examiner

RECEPTACLE DEVICE AND MOTOR VEHICLE PROVIDED THEREWITH

This application is a 35 U.S.C. §371 National Stage entry of PCT/DE2006/000440, filed Mar. 10, 2006, which claims priority from German Patent Application No.: 10 2005 011 678.7, filed Mar. 11, 2005, the contents of which are herein incorporated by reference.

The present invention relates to a receptacle device for a motor vehicle.

A receptacle device of the type defined above is already known from EP 0 761 503 A1, which describes a parcel shelf comprising a rear shelf and a tray-shaped container, the receptacle device being mounted between the cargo space and the passenger space approximately at the level just below the head support on the back seat. When the trunk is closed, the rear shelf sits on the tray-shaped container, preventing access to objects inside the tray-shaped container from either the passenger space or outside of the vehicle. When the trunk is open, the rear shelf may be connected to the trunk lid so that by opening the trunk the rear shelf is also raised at the same time and the interior of the tray-shaped container is exposed.

However, such a receptacle device is associated with disadvantages. In particular the objects stowed in the tray-shaped container cannot be accessed while driving because access is blocked by the rear shelf. Furthermore, the rear shelf cannot be removed or raised because it is mounted as a form-fitting element inside a receptacle with an accurate fit.

This is where the present invention begins, its object being to provide a receptacle device of the type defined in the preamble such that the contents of the tray-shaped container can be accessed even when driving.

According to this invention, this object is achieved by a receptacle device having the characterizing features of claim 1. Due to the fact that the rear shelf is made of a flexible material in at least some sections, the rear shelf may be deformed in a predetermined manner to allow access to the contents of the tray-shaped container. Such deformation is impossible with a rear shelf according to the state of the art, thus essentially preventing access to the contents of the tray-shaped container while driving and/or when the trunk is closed.

In an advantageous embodiment of the present invention, the material of which the rear shelf is made may be a textile sheeting material. A textile sheeting material is capable of sealing the tray-shaped container in a suitable manner on the one hand, while on the other hand being deformed in the desired manner so that access to the contents of the tray-shaped container can be allowed.

In another advantageous embodiment of the present invention, the rear shelf may be designed to be rolled up. Accordingly, the rear shelf may advantageously be conveyed into an area of the receptacle device so that the contents of the tray-shaped container may optionally be concealed or exposed. The rear shelf may also be secured advantageously in a rolled up condition.

Alternatively or additionally, it is possible for the rear shelf to be designed for folding. This measure also allows the rear shelf to be converted to a state in which the interior of the tray-shaped container is exposed.

Alternatively or additionally, it is also possible for the rear shelf to be designed for being pushed together. This measure also makes it possible to allow optional access to the tray-shaped container while driving.

In another advantageous embodiment of the present invention, the tray-shaped container may have a number of receptacle compartments. This measure makes it possible to prevent small objects from being held in an uncontrolled manner in the tray-shaped container. Different areas may also be formed, e.g., for a warning triangle, a first aid kit, etc.

Another object of the present invention is to propose a motor vehicle which can advantageously be protected to prevent exhaust gases from penetrating into the vehicle when the trunk is open.

To achieve this object, it is proposed that the motor vehicle shall be equipped with at least one receptacle device according to any one of Claims 1 through 6. This yields the possibility that the rear shelf fulfills a double function, acting both as a sealing means for the tray-shaped container and forming a bulkhead against the penetration of exhaust gas when the trunk is open. To this end, the rear shelf may be mounted in a suitable manner.

In this connection, it is advantageously possible for the rear shelf to be equipped to be mounted in an area between the inside roof liner, the side walls of a vehicle and a back seat of the vehicle. If the rear shelf is mounted in the aforementioned manner, maximal sealing of the interior of the vehicle to prevent the penetration of exhaust gases can be achieved.

It is advantageously possible here for the rear shelf to be equipped with fastening means which can be connected to corresponding fastening means in the interior of the vehicle.

Additional features and advantages of the present invention will be clear on the basis of the following description of preferred exemplary embodiments with reference to the accompanying figures, in which FIG. 1 shows a sectional view of a motor vehicle from the side with a receptacle device according to this invention in a closed state;

Figure 1:
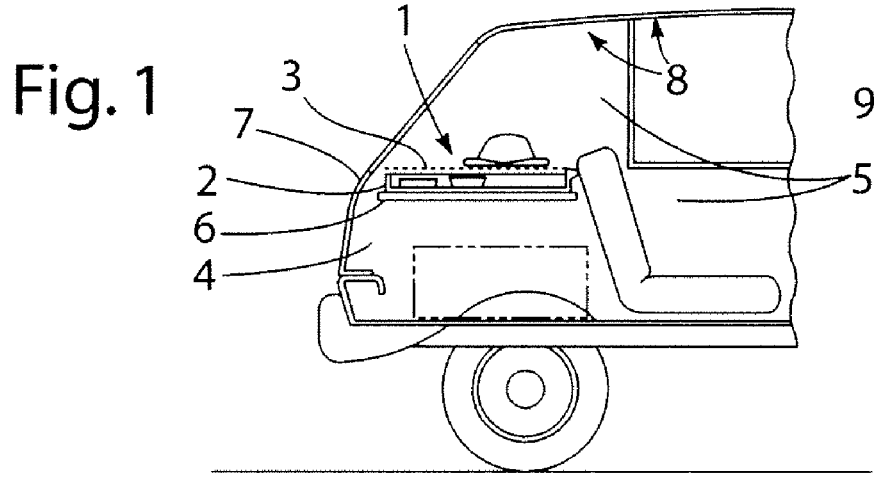
Figure 2:
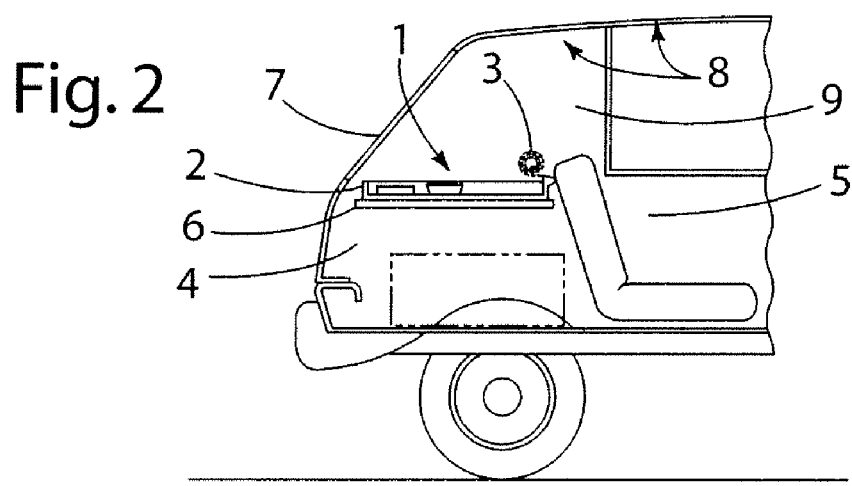
FIG. 2 shows a sectional view of a motor vehicle from the side with an inventive receptacle device in an open state (rear shelf rolled up)
Figure 3:
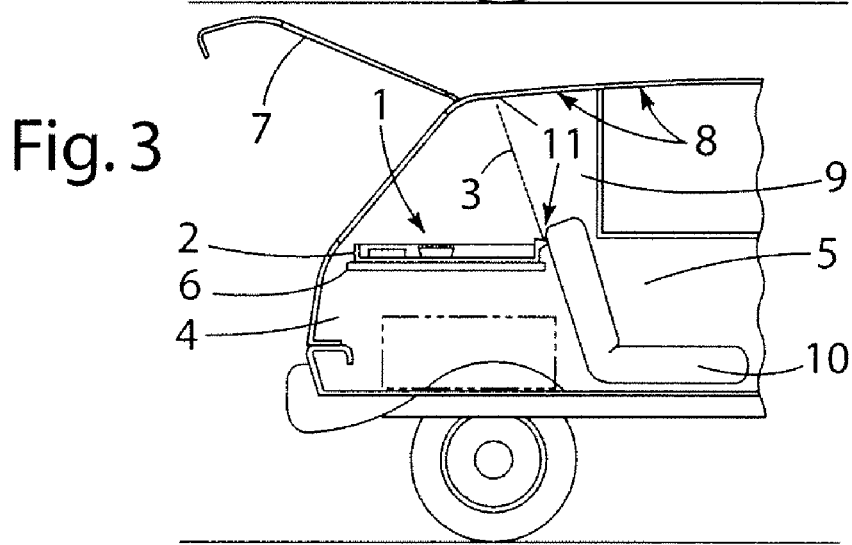
FIG. 3 shows a side sectional view of a motor vehicle with an inventive receptacle device in a sealing state of the rear shelf (rear shelf mounted in the interior of the vehicle, preventing the penetration of exhaust gases).

Reference is first made to FIG. 1.

An inventive receptacle device 1 comprises essentially a tray-shaped container 2 and a rear shelf 3 which optionally seals the tray-shaped container 2.

As shown in FIG. 1, the receptacle device 1 is arranged in an area between a cargo space 4 and a passenger space 5 of a motor vehicle at the level of the so-called railing line. Projections 6 are provided to hold the receptacle device 1, whereby the receptacle device 1 may be placed essentially on the projections 6 and/or may be pivoted about a pivot axis (not shown). In addition, a trunk lid 7 is provided, preferably extending over the area of the cargo space 4 as well as the area of the passenger space 5 and preferably being pivotable vertically.

According to this invention, the rear shelf 3 is made of a flexible material in at least some sections. Accordingly, the rear shelf 3 may preferably be rolled up or folded up in any situation, even when the trunk lid 7 is closed or while driving. Therefore, access to the tray-shaped container 2 is enabled, so that objects may ultimately be removed from the tray-shaped container 2 or placed in it even when the trunk lid 7 is closed or while driving. Such an option does not exist with a receptacle device according to the state of the art, because the rear shelf is made of an inflexible material which cannot be deformed in the required manner.

The inventive flexible rear shelf 3 may fulfill an additional function when the trunk lid 7 is opened, namely in that the rear shelf 2 is equipped to be mounted in an area between an inside roof liner 8, vehicle side walls 9 and the upper end of a back seat 10. An inventive rear shelf 3 equipped in this way is capable of preventing exhaust gases from penetrating into the passenger space 5 when the trunk lid 7 is open. To this end, the rear shelf 3 and the inside roof liner 8, the vehicle side walls 9 and the back seat 10 may be equipped with suitable detachable fastening means 11.

The invention claimed is:

1. Receptacle device for covering a cargo space of a motor vehicle whereby the receptacle device comprises at least:
   a tray-shaped container,
   a rear shelf made of a flexible material in at least some sections
   equipped for covering the tray-shaped container,
   wherein the receptacle device is disposed between the cargo space and a passenger space of the vehicle, and
   wherein the rear shelf is equipped for being mounted in an area between an inside roof liner, vehicle side walls and a back seat of the motor vehicle, wherein airflow is restricted between the passenger space and cargo space even if a vehicle trunk is in an open position.

2. Receptacle device of claim 1, characterized in that the material of the rear shelf is a textile sheeting material.

3. Receptacle device of claim 1, characterized in that the rear shelf is equipped for being rolled up.

4. Receptacle device of claim 1, characterized in that the tray-shaped container has a number of receptacle compartments.

5. A motor vehicle, comprising at least one receptacle device of claim 1.

6. Motor vehicle of claim 5, wherein rear shelf is equipped with fastening means.

* * * * *